United States Patent [19]

Vuori et al.

[11] Patent Number: 5,691,982
[45] Date of Patent: Nov. 25, 1997

[54] METHOD FOR TRANSFERRING DATA TRANSMITTED FROM BASE STATIONS TO A PAGING AREA CONTROLLER IN A PERSONAL PAGING NETWORK

[75] Inventors: Jarkko Vuori; Seppo Seitsonen, both of Espoo; Esa Pulkki, Vantaa, all of Finland

[73] Assignee: Tecnomen Oy, Espoo, Finland

[21] Appl. No.: 408,224

[22] Filed: Mar. 22, 1995

[30] Foreign Application Priority Data

Mar. 23, 1994 [FI] Finland .................................. 941346
Mar. 23, 1994 [FI] Finland .................................. 941347

[51] Int. Cl.$^6$ ........................ H04Q 7/00; H04J 3/00
[52] U.S. Cl. .................... 370/336; 370/528; 340/311.1; 455/56.1
[58] Field of Search .............. 364/514 R; 340/825.44, 340/311.1; 370/95.1, 95.3, 110.1, 111, 97, 328, 336, 522, 528; 455/7, 31.1, 53.1, 54.1, 56.1, 68; 379/58, 59, 63

[56] References Cited

U.S. PATENT DOCUMENTS

| | | | |
|---|---|---|---|
| 4,352,955 | 10/1982 | Kai et al. | 370/110.1 |
| 4,600,922 | 7/1986 | Dunkerton et al. | 340/825.44 |
| 5,495,508 | 2/1996 | Kaewell, Jr. et al. | 455/53.1 |
| 5,502,721 | 3/1996 | Pohjakallio | 370/95.1 |
| 5,533,028 | 7/1996 | Hita de la Torre et al. | 370/95.3 |

*Primary Examiner*—Hassan Kizou
*Attorney, Agent, or Firm*—Michael L. Dunn

[57] ABSTRACT

The invention relates to a method for the transfer of data transmitted from a base station (PBS) to a central station (PAC) in a personal paging network, comprising base stations (PBS) for transmitting paging messages over a radio and a central station (PAC) for controlling operation of the base stations on the basis of data received from the base stations. The radio channel used for the transmission of paging messages is also used for the transfer of said data to be transmitted from the base stations (PBS) to the central station (PAC).

10 Claims, 5 Drawing Sheets

PBS= Paging Base Station
PAC= Paging Area Controller
PNC= Paging Network Controller
OMC= Operating and Maintenance Centre
NR= Network Router
Sat= Satellite PBS= Paging Base Station
PAC= Paging Area Controller
PNC= Paging Network Controller
OMC= Operating and Maintenance Centre
NR= Network Router
Sat= Satellite D= data transfer
P= paging transmission A= PBS A's packets
B= PBS B's packets
.....

H= message heading
N= indentification of PBS
D= data
C= checksum, CRC

METHOD FOR TRANSFERRING DATA TRANSMITTED FROM BASE STATIONS TO A PAGING AREA CONTROLLER IN A PERSONAL PAGING NETWORK

BACKGROUND OF THE INVENTION

The present invention relates to a method for transferring data transmitted from base stations to a central station in a personal paging network, comprising base stations for transmitting paging messages over a radio and a central station for controlling operation of the base stations, whereby the radio channel used for transmitting the paging messages is also used for the transfer of said data transmitted from paging base stations PBS to a central station PAC, characterized in that said radio channel is used for the transfer of said base station data at preset times D between pagings P, and that the radio messages transmitted from a single base station PBS to the central station PAC travel through one or more base stations in such a manner that at least one base station, which is a paging area node station PBS01, is in a fixed data transfer communication with the central station PAC, and that the data to be transferred from the base stations to the central station is transmitted by means of said radio channel from a plurality of base stations PBS to said node station.

The use of fixed or optional telephone lines for data transfer between base stations and a central station incurs costs and the quality of data transfer may sometimes be poor. Some base stations are not capable of receiving a telephone line at all. This requires a wireless communication.

The presently available solutions involve the following drawbacks. The use of telephone (modem) lines requires purpose-designed equipment as well as line installations and, thus, the solution is expensive. It is possible to use satellite communications (simplex) for the transmission of pagings to base stations but the data from the base stations to a central station must be transferred by other means since the use of a satellite communication for the transmission of base station data is not economically sensible. It is also possible to use a separate radio channel for this data transfer operation but that requires its own equipment and is therefore expensive.

When using a radio channel for the transfer of base station data from base stations to a central station, it is necessary to consider the unreliability of communications, i.e. possible breakdowns and other failures. When the same radio channel is used for the transmission of pagings, too much of the channel capacity must not be reserved for the data transfer in order not to compromise transmission of the actual pagings.

The data transfer effected between paging base stations over a radio can be carried out by means of implicit routing with all base stations repeating everything heard thereby. The efficiency is poor. The transfer of base station data takes a substantial part of the data transfer capacity of a base station network.

BRIEF DESCRIPTION OF THE INVENTION

An object of the invention is to improve the above-described method in such a manner that the transfer of base station data transmitted from base stations to a central station by the use of a radio channel can be routed adaptively and over an optimized radio time.

This object is achieved on the basis of the characterizing features set forth in the appended claim 1 or claim 2.

When a radio channel used for the transmission of paging messages is also used for the transfer of said data sent from base stations to a central station, it is possible to achieve the benefits of a wireless network and to provide a higher-quality data transfer. When the channel used is the same as that used for pagings, the data transfer channel need not be provided with separate transmitters. In the event of a satellite communication failure, the network operation can be secured over at least 10 . . . 20% of the full capacity.

As compared to implicit routing, a routing system of the invention is capable of optimizing the use of radio time in such a manner that as little as possible of the radio channel capacity is reserved for data transfer (max 4% of the capacity). The adaptive routing is capable of avoiding the failures caused by network breakdowns and other faults in the operation of a network, i.e. the reliability is good.

DETAILED DESCRIPTION OF THE INVENTION

Figure 1:
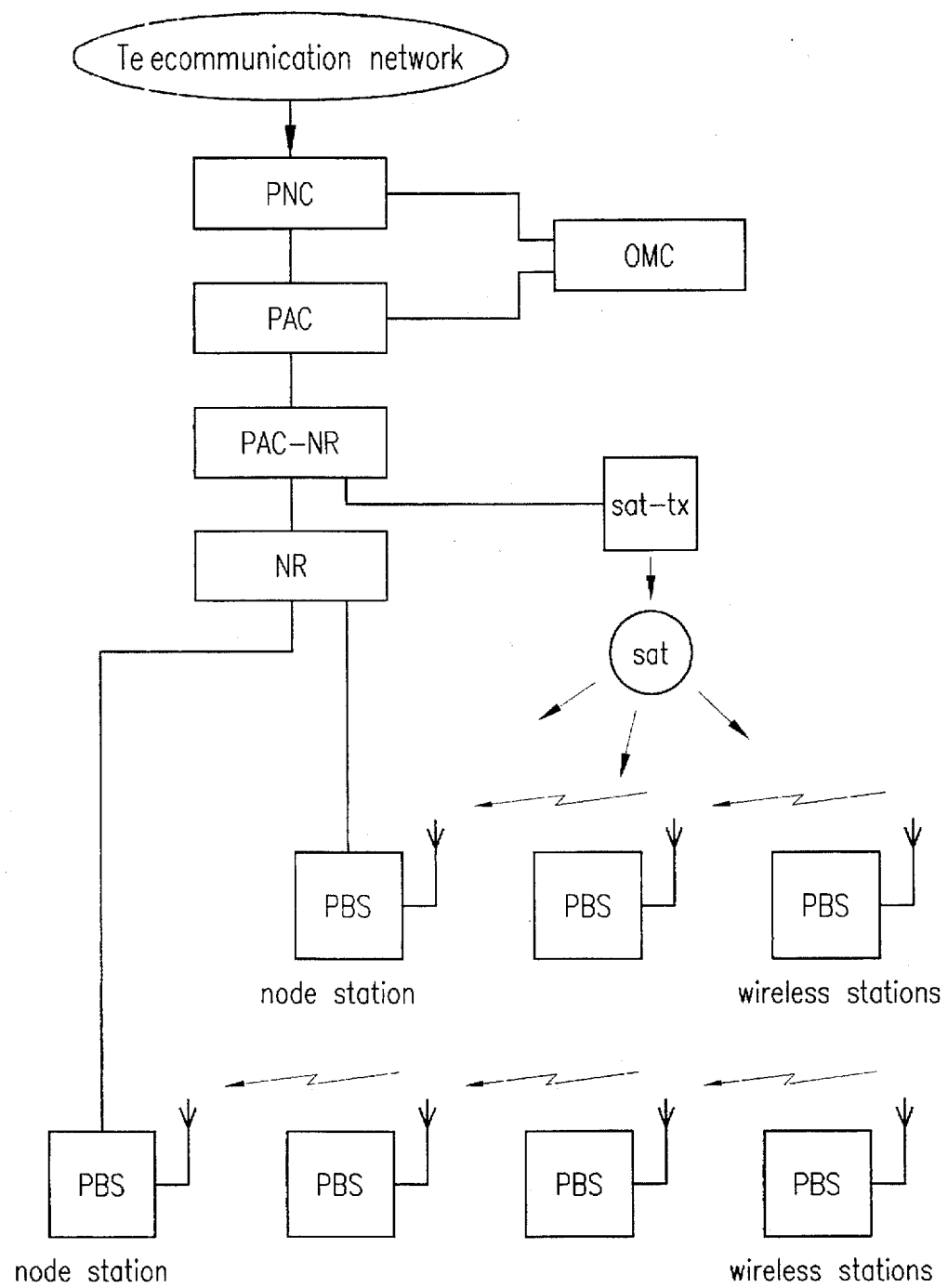
FIG. 1 shows a block diagram of a personal paging system for applying a method of the invention.

The block diagram of FIG. 1 shows wireless paging base stations PBS which are over a radio channel in a data transfer communication with each other as well as with node stations which, over network routers NR and PAC-NR, are in a fixed or wired data transfer communication with a paging area controller PAC which is connected over a paging network controller PNC with a public telephone network. PAC and PNC are connected to an operating and maintenance center OMC, wherefrom the system operations can be monitored and controlled also manually.

In view of the operation of a paging system, the operation of a system using a radio channel is not different from a system operating on a wired data transfer communication. The messages to be transmitted from the base stations PBS to the central station PAC consist of e.g. fault information, diagnostical information and measuring information from base stations.

Each base station is provided with a satellite receiver for receiving the pagings and control data from PAC.

The base stations are provided with radio receivers used for receiving base station data from other base stations.

Figure 2:
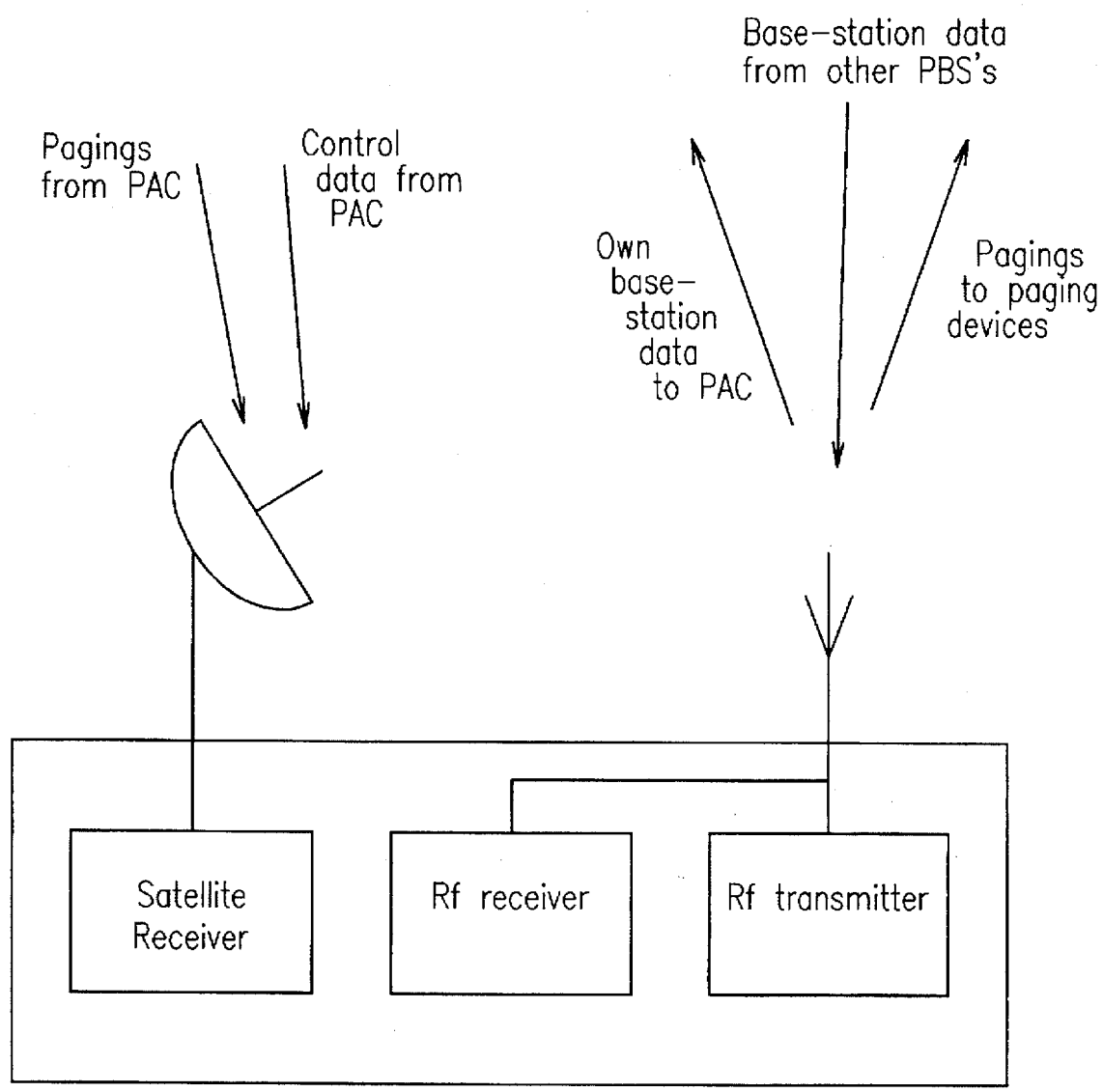
FIG. 2 shows a conceptual view of a base station and its communication.

The base station is provided with a radio transmitter used for the transmission of both pagings and base station data (at the same frequency). The transmission of pagings is discontinued for the duration of transmitting and receiving base station data. The transmission and reception of base station data is effected between the pagings at fixed intervals. FIG. 2 shows a conceptual view of a base station and its communication.

Figure 3:
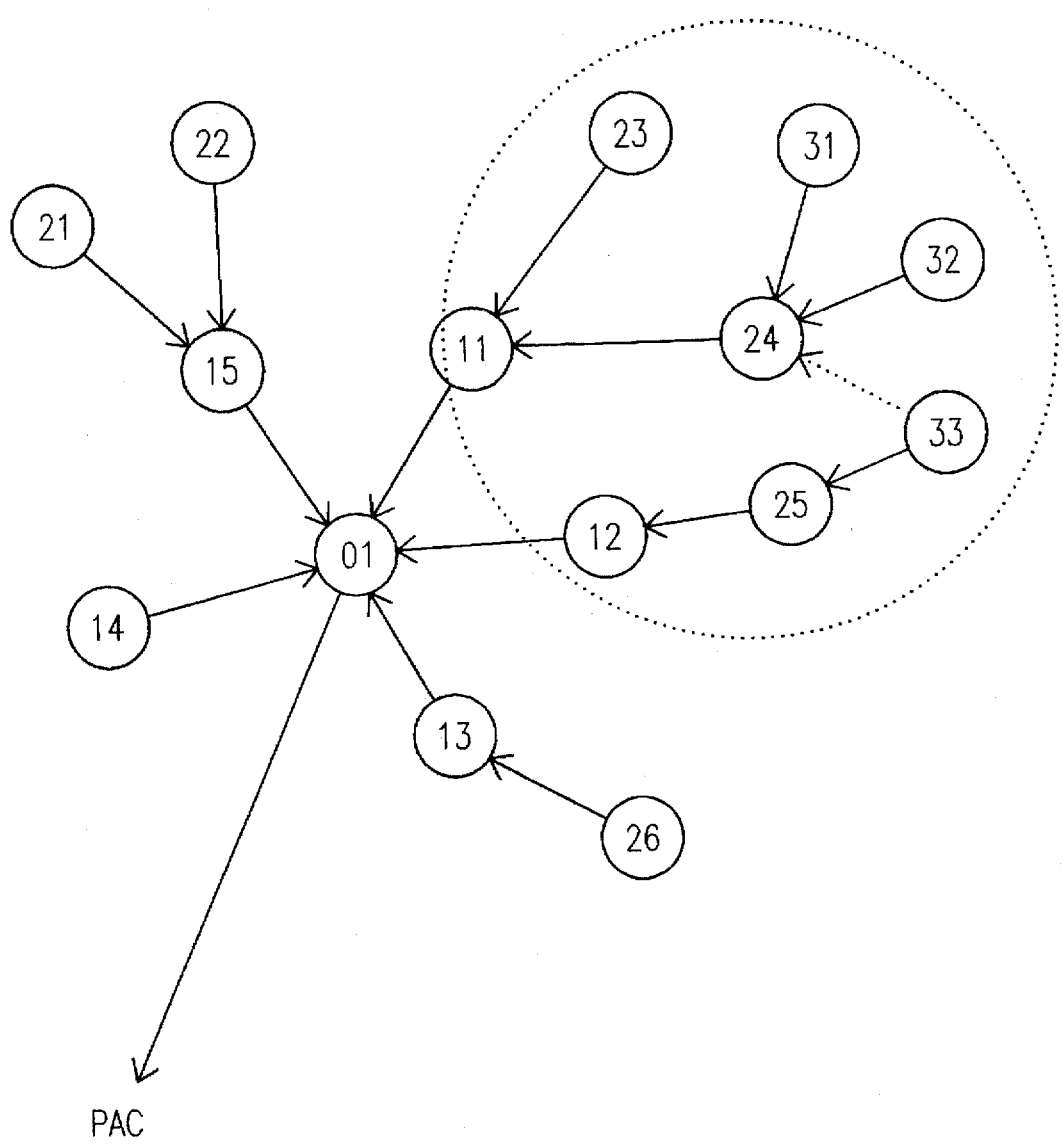
FIG. 3 shows a conceptual view of the data transfer in a base station network.

As shown by way of an example in FIG. 3, each base station forms around itself a sort of data transfer network consisting of those base stations that are capable of hearing each other. The messages progress from a base station to the central station via one or more base stations. Each base station monitors all those other base stations it is capable of hearing.

Thus, the paging base station data to be sent from each base station (PBS) is transmitted over other base stations to a node base station, which forwards the data to PAC e.g. over a fixed connection. In FIG. 3, 01 is a node station.

2 . . . 4% of all paging base stations (paging area node stations) are fixedly connected to the central station (two-way communication). These node base stations forward the data from other base stations to PAC.

Each base station is provided with a route for delivering its data to an intended destination. In the base station network of FIG. 3, for example, the data of PBS32 is transferred over PBS24 and PBS11 to PBS01, which is a node station and linked with a fixed connection to the paging area controller PAC. Respectively, the messages of PBS33 are routed as follows: 33-25-12-01-PAC.

The routes are optimized in view of loading the data transfer capacity of a network as little as possible. The nature of routing is dynamic, repeated optimization, i.e. the fluctuations in the network conditions are under constant observation. Thus, the configuration of a network may change in the middle of operation.

Figure 5:
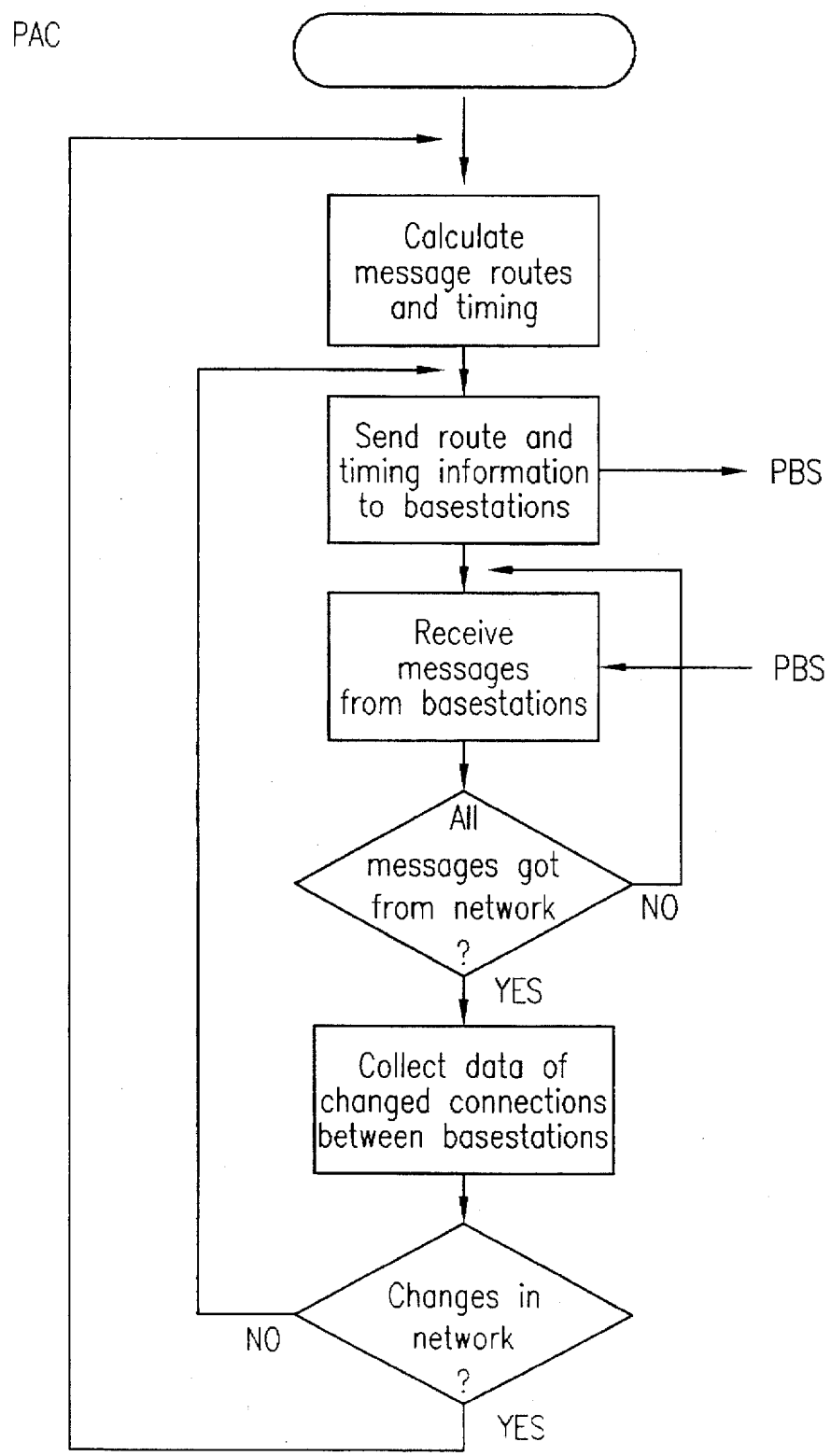
FIG. 5 shows a flow chart for the operation of a paging area controller PAC in routing.

The routings and timings of a wireless paging system are effected by means of PAC, which is provided with a calculation capacity sufficient for the purpose. The operation of PAC in routing is depicted in the annexed flow chart (FIG. 5).

As for each PBS, a chart is maintained by PAC for those PBS's which it is capable of hearing and for those which can disturb reception from the above audible stations. Said chart is first fed in from the network OMC. In FIG. 3, PBS24 is able to hear stations 11, 12, 23, 25, 31, 32 and 33. The PBS's monitor the transmission of other paging base stations audible thereto and inform PAC of the anomalies detected thereby (e.g. PBS's entered and deleted).

PAC calculates optimal routings and updates the routing charts for the PBS's over a satellite communication. The routing chart reveals at which moment each PBS sends the messages and which stations' messages it forwards. For example, the chart for PBS24 shown in FIG. 3 indicates that it sends forward the messages from PBS13 and PBS32.

Figure 4A:
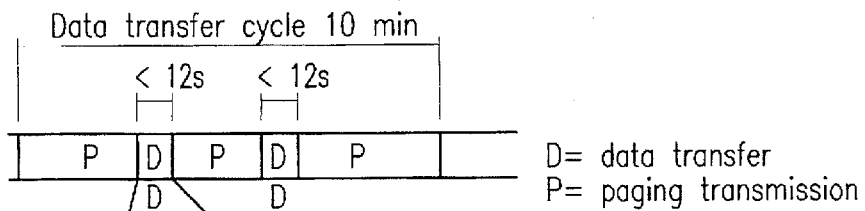
FIGS. 4a, 4b and 4c show the adaptation of base station data transmitted by various base stations in-between and within the pagings.

The PBS's transmit messages at set times between pagings. During each 10 minute period, the data transfer is allocated max. two 12 s intervals (FIG. 4a). Thus, max. 4% of a radio channel is taken up. The first interval is used for sending the messages of as many PBS's as can be accommodated thereby and, if there are more messages, those will be transmitted during the second interval.

Figure 4B:
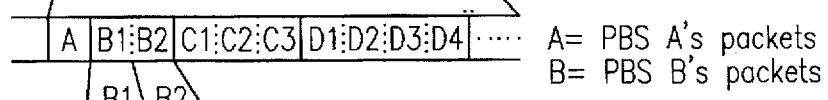

Within the interval, PAC provides each PBS with the exact moment for commencing the transmission of its data packet (FIG. 4b). First transmitted is its own packet, followed by received packets to be forwarded. In FIG. 4b, the transmission turn B is used for sending an own packet B 1 and a packet B2 to be forwarded.

Simultaneous transmission can be effected by those stations which do not interfere with each other. The PBS's transmitting simultaneously are allocated an equally long time having a duration which is determined by that PBS which has most messages to forward. In FIG. 3, PBS31 and PBS32 cannot transmit simultaneously but, for example, PBS22 and PBS24 can. Since PBS24 has messages of 2 stations to forward and PBS22 has none, the duration is determined according to PBS24.

Within a time interval, when a given PBS does not have a transmission turn, its transmitter is switched off and receiver switched on for receiving messages from other PBS's.

Figure 4C:
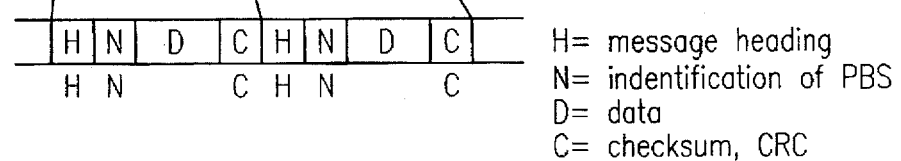

Each data packet is provided with a synchronization field, an identification number for the transmitting paging base station, information about the contents of a message, and a checksum CRC (FIG. 4c). If the reception of a message to be forwarded fails (poor audibility, incorrect CRC, or the like), the message is replaced by a fault report revealing an identification for this particular PBS and for itself.

If PBS is disconnected from the network, the next paging base station informs PAC of this (by sending a fault report) and the latter determines the routes circumventing this PBS. PAC sends the information forward to OMC. The disconnected PBS is detected within no more than 10 minutes, which is a transfer interval for the paging base station data. A disconnection is interpreted to have occurred, if no information has been received from PBS during its transmission turn. Referring to FIG. 2, if PBS25 is disconnected, the routing chart of PBS24 is revised in such a manner that it forwards also the messages from PBS33.

When a new base station is connected to a network, it first transmits its own identification number within an interval which is allocated to new stations. The base stations, which are able to hear the new station, forward the message to PAC which provides the new station with a transfer interval and routing information as well as includes the new station in the routing charts.

What is claimed is:

1. A method for transferring data transmitted from paging base stations (PBS) to a central station (PAC) in a personal paging network, comprising: transmitting paging messages over a radio channel using the base stations (PBS); controlling operation of the base stations using the central station (PAC); using the radio channel both for transmitting the paging messages and for the transfer of said data transmitted from the base stations (PBS) to the central station (PAC); using said radio channel for the transfer of base-station data at preset times (D) between pagings (P), and transmitting the base-station data from a single base station (PBS) to the central station (PAC) through one or more other base stations in such a manner that at least one base station, which is a paging area node station (PBS01), is in a fixed data transfer communication with the central station (PAC), and transmitting the data to be transferred from the base stations to the central station by means of said radio channel from a plurality of base stations (PBS) to said node station.

2. A method as set forth in claim 1, wherein the data to be transferred from the base stations (PBS) to the central station (PAC) includes not only failure information but also diagnostical and measuring information, on the basis of which the central station (PAC) controls operation of the base stations.

3. A method for routing base-station data to be transmitted from wireless base stations over a radio channel in a personal paging network, comprising transmitting paging messages over the radio channel using the base stations; controlling operation of the base stations using a central station (PAC); transmitting base-station data from the base stations (PBS) to the central station (PAC) through one or more base stations (PBS); providing the base stations (PBS) transmitting base-station data with individual routing charts determining when the transmission occurs and which base station transmits base-station data that is forwarded by means of the routing charts provided to the base stations (PBS) transmitting base station data.

4. A method as set forth in claim 3, wherein said base-station data is transmitted at preset times (D) between pagings (P).

5. A method as set forth in claim 4, wherein messages used for the transfer of base-station data are received at a node base station (PBS01), which is in a fixed data transfer communication with the central station (PAC).

6. A method as set forth in claim 4, wherein said central station or a part of it consists of a paging area controller (PAC) for determining routings for base-station data on the basis of information received from the base stations (PBS) and updating said routing charts for the base station.

7. A method as set forth in claim 3, wherein messages used for the transfer of base-station data are received at a node base station (PBS01), which is in a fixed data transfer communication with the central station (PAC).

8. A method as set forth in claim 7, wherein said central station or a part of it consists of a paging area controller (PAC) for determining routings for base-station data on the basis of information received from the base stations (PBS) and updating said routing charts for the base stations.

9. A method as set forth in claim 3, wherein said central station or a part of it consists of a paging area controller (PAC) for determining routings for base-station data on the basis of information received from the base stations (PBS) and updating said routing charts for the base stations.

10. A method as set forth in claim 3, wherein the data to be transferred from the base stations (PBS) to the central station (PAC) includes not only failure information but also diagnostical and measuring information, on the basis of which the central station (PAC) controls operation of the base stations.

* * * * *